United States Patent [19]

Hamersma et al.

[11] Patent Number: 4,942,188

[45] Date of Patent: Jul. 17, 1990

[54] POLYMER MIXTURE COMPRISING POLYBUTYLENE TEREPHTHALATE, AROMATIC POLYCARBONATE AND POLYDIALKYSILOXANE

[75] Inventors: Wilhelmus Jozefus L. A. Hamersma; Jan de Boer; Wilhelmus M. M. Roovers, all of Bergen op Zoom; Gerrit de Wit, Ossendrecht, all of Netherlands

[73] Assignee: General Electric Company, Pittsfield, Mass.

[21] Appl. No.: 269,226

[22] Filed: Nov. 9, 1988

[30] Foreign Application Priority Data

Jan. 15, 1988 [NL] Netherlands ............... 8800083

[51] Int. Cl.$^5$ .............................. C08K 9/06
[52] U.S. Cl. ........................ 523/212; 523/209; 523/210; 523/216; 524/267
[58] Field of Search ............ 524/267; 523/209, 210, 523/212, 216

[56] References Cited

U.S. PATENT DOCUMENTS

| 3,169,121 | 2/1965 | Goldberg | 528/173 |
|---|---|---|---|
| 4,001,184 | 1/1977 | Scott | 528/182 |
| 4,125,572 | 11/1978 | Scott | 524/449 |
| 4,257,937 | 3/1981 | Cohen et al. | 525/67 |
| 4,280,949 | 7/1981 | Dieck | 525/67 |
| 4,535,124 | 8/1985 | Binsack et al. | 525/67 |
| 4,554,315 | 11/1985 | Chung et al. | 525/67 |

FOREIGN PATENT DOCUMENTS

| 0079477 | 5/1983 | European Pat. Off. . |
| 0107048 | 5/1984 | European Pat. Off. . |
| 0110222 | 6/1984 | European Pat. Off. . |
| 0239157 | 9/1987 | European Pat. Off. . |
| 1569296 | 6/1980 | United Kingdom . |

OTHER PUBLICATIONS

Patent Abstracts of Japan, Sep. 13, 1985, 60-88064, Seikosha et al. .
Kirk-Othmer, vol. 20, (1982) pp. 936-940.

*Primary Examiner*—Melvyn I. Marquis
*Assistant Examiner*—Karen A. Hellender
*Attorney, Agent, or Firm*—Spencer D. Conard; William F. Mufatti

[57] ABSTRACT

The invention relates to polymer mixtures which comprise a polybutylene terephthalate, an aromatic polycarbonate, and a dialkyl silicone fluid. Due to the presence of the dialkyl silicone fluid compound a good lacquer bonding is obtained.

21 Claims, No Drawings

POLYMER MIXTURE COMPRISING POLYBUTYLENE TEREPHTHALATE, AROMATIC POLYCARBONATE AND POLYDIALKYSILOXANE

The invention relates to a polymer mixture which comprises a polybutylene terephthalate and an aromatic polycarbonate.

Such mixtures are known per se. For this purpose reference may be made, for example, to GB-A-1569296.

Polymer mixtures which comprise a polybutylene terephthalate, a polycarbonate, and an agent to improve the impact strength are disclosed in US-A-4,257,937 and US-A-4,280,949.

The known mixtures generally have favorable properties: they have good mechanical properties and can withstand the influence of organic solvents. As a result of this, these mixtures are suitable to manufacture therefrom parts for motor-cars, for example, bumpers.

It is sometimes desirable to provide the articles formed from the polymer mixtures with a decorative lacquer layer. In the known polymer mixtures bonding problems may occur between the polymer surface and the lacquer layer.

The invention provides polymer mixtures which comprise A. a polybutylene terephthalate and B. an aromatic polycarbonate to which a polymeric auxiliary substance has been added which ensures a better bonding with the lacquer layer.

The polymer mixture according to the invention is characterised in that it comprises 0.1-5 parts by weight of a dialkyl silicone fluid (C) per 100 parts by weight of A+B.

Patent Abstracts of Japan, vol. 9 no. 228 (C-303) (1951) of Sept. 13, 1985 describes an electrically conductive resin composition obtained by blending, a polycarbonate resin, a polybutylene terephthalate resin, silicone oil and aluminum fibers having a diameter of 1-50 micrometer and an aspect ratio of 50 or above.

The polymer mixture according to the invention preferably comprises a dimethyl silicone fluid as the dialkyl silicone fluid.

The weight ratio of the polybutylene terephthalate to the aromatic polycarbonate in the polymer mixture according to the invention is preferably chosen to be so that it is more than 0.7.

The polymer mixture according to the invention may comprise 0.1-100 parts by weight of conventional additives per 100 parts by weight of A+B.

The polymer mixture according to the invention preferably comprises 0.1-50 parts by weight of an agent to improve the impact strength per 100 parts by weight of A+B.

As an agent to improve the impact strength is preferably used a core-shell polymer built up from a rubber-like core on which one or more shells have been grafted.

The polymer mixture according to the invention comprises at any rate the following constituents:
A. one or more polybutylene terephthalates
B. one or more aromatic polycarbonates, and
C. one or more dialkyl silicone fluids.

The polymer mixture may comprise one or more of the following constituents:
D. conventional additives.
E. one or more agents to improve the impact strength.

A. Polybutylene Terephthalate

Polybutylene terephthalate is a polymer known per se. It is derived from butane-1,4-diol and terephthalic acid. It is possible to use copolyesters in the polymer mixtures in which a part of the diol compound and/or a part of the terephthalic acid has been replaced by another diol and/or carboxylic acid. For the polymer mixtures according to the invention it is to be preferred to use a polybutylene terephthalate which is built up for more than 70 mol% from units derived from butane-1,4-diol and terephthalic acid.

It is possible to use polybutylene terephthalate in which a branching agent, for example, a glycol having three or more hydroxyl groups or a trifunctional or a polyfunctional carboxylic acid has been incorporated.

B. Aromatic Polycarbonate

Aromatic polycarbonates are materials known per se. They are generally prepared by reacting a dihydric phenol compound with a carbonate precursor, for example, phosgene, a halogen formate or a carbonate ester. Aromatic polycarbonates are polymers which comprise units of the formula

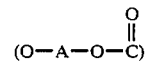

wherein A is a bivalent aromatic radical derived from the dihydric phenol used in the preparation of the polymer. Dihydric phenols which may be used in the preparation of the aromatic polycarbonates are mononuclear or polynuclear aromatic compounds which comprise two hydroxy radicals which are each directly bonded to a carbon atom of an aromatic nucleus.

The branched polycarbonates as described, for example, in US-A-4,001,184 are also suitable.

Suitable aromatic polycarbonates are also the so-called polyester carbonates which are obtained by performing the polymerization reaction in the presence of an ester precursor, for example, terephthalic acid or an ester-forming derivative thereof. These polyester carbonates have ester compounds and carbonate compounds in the polymeric chain. Polyester carbonates are described, for example, in US-A-3,169,121.

C. Dialkyl Silicone Fluids

Dialkyl silicone fluids are compound per se. For this purpose reference may be made, for example, to Kirk-Othmer, Vol. 20, 1982, pp. 936-940.

Dimethyl silicone fluids are preferably used as a dialkyl silicone fluid. It is essential that dialkyl silicone fluids are used; in fact it has been found that an alkylaryl silicone fluid, for example, phenyl silicone and copolymers of dialkyl silicones and diaryl silicones do not provide the desired improvement of the bonding. The dialkyl silicone fluid may comprise two different alkyl groups or even a mixture of various alkyl groups. The relative quantity of the various alkyl groups may be chosen arbitrarily. It is of importance for each silicon atom in the chain to be bonded with on an average approximately two alkyl groups but not with aryl groups.

D. Conventional Additives

In addition to the constituents mentioned hereinbefore the polymer mixture according to the invention may comprise one or more additives, with the exception of aluminum fibers. Examples of suitable additives are stabilisers, transesterification inhibitors, dyes, pigments, fillers and reinforcing fibers, for example, glass fibers, release agents.

E. Agent to Improve the Impact Strength

The polymer mixture according to the invention may comprise one or more agents to improve the impact strength.

So-called core-shell polymers built up from a rubber-like core on which one or more shells have been grafted are preferably used. The core usually consists substantially of an acrylate rubber or a butadiene rubber.

One or more shells have been grafted on the core. Usually these shells are built up for the greater part from a vinylaromatic compound and/or a vinylcyanide and or an alkyl(meth)acrylate and/or (meth)acrylic acid. The core and/or the shell(s) often comprise multifunctional compounds which may act as a cross-linking agent and/or as a grafting agent. These polymers are usually prepared in several stages.

The polymer mixture according to the invention can be obtained according to any conventional method of preparing polymer mixtures. The individual constituents are preferably mixed collectively in the melt (compounded) in an extruder. The extrudate (in strand form) which emanates from the extruder is chopped to pellets. The pellets may, for example, be further processed in an injection molding machine.

EXAMPLES I TO IV, COMPARATIVE EXAMPLES A, B AND C

Various polymer mixtures were prepared starting from the following constituents:

PBT 1: polybutylene terephthalate having an intrinsic viscosity of 1.19 dl/g, measured in a 60/40 mixture of phenol and tetrachloroethane at 25° C.

PBT 2: polybutylene terephthalate having an intrinsic viscosity of 1.10 dl/g.

PC: an aromatic polycarbonate derived from bisphenol A and phosgene having an intrinsic viscosity of 58.5 ml/g measured in methylene chloride at 25° C.

IM: an agent to improve the impact strength of the core-shell type having a core consisting substantially of a butadiene rubber on which a shell of a copolymer substantially built up from methylmethacrylate and styrene has been grafted.

ST: a mixture of various conventional stabilisers.

PE: polyethylene.

SC1: a dimethyl silicone fluid having a nominal viscosity of 12,500 centistokes (cSt).

SC2: a dimethyl silicone fluid having a nominal viscosity of 5000 cSt at 25° C.

SC3: a methyl phenyl silicone fluid having a nominal viscosity of 30 cSt at 25° C.

SC4: a dimethyl diphenyl silicone fluid having a nominal viscosity of 400 cSt at 25° C.

The various constituents were compounded in a Werner Pfleiderer extruder in the quantities as indicated in the table hereinafter(average of the adjusted temperatures: 235° C.). The resulting extrudate was chopped to pellets. Disks were injection-molded from the pellets to determine the lacquer bonding (diameter of the disks: 10 cm, thickness 3 mm).

The surface of the disks was slightly roughened by moving the bottom of a beaker glass over it. The surface was then decreased with isopropyl alcohol. The treated surface was then painted by means of a spray gun. The lacquer used was lacquer No. 47020 of Messrs. Herberts. The lacquered disks were cured at 50° C. for 48 hours. The bonding strength was then determined according to DIN 53151 with TESA¾ tape 4651.

Evaluation "Gt0" denotes a good bonding; evaluation "Gt5" denotes a poor bonding. In most of the cases the test was carried out four times. The results obtained are recorded in the table.

The lacquer bonding was also determined after the so-called "Schwitzwasser test" (DIN 50017). In this test the lacquered disks were stored at 40° C. and a relative humidity of 100% for 240 hours, after which the lacquer bonding was determined according to DIN 53151.

Test pieces were also injection-molded from the resulting pellets to determine the Vicat B value.

The results obtained are also recorded in the following table.

TABLE

| | Example | | | | | | |
|---|---|---|---|---|---|---|---|
| | A | B | C | I | II | III | IV |
| Composition (parts by weight) | | | | | | | |
| PBT1 | 61 | 59.1 | 59.1 | 59.6 | 58.6 | — | — |
| PBT2 | — | — | — | — | — | 59.1 | 60.3 |
| PC | 15 | 15 | 15 | 15 | 15 | 15 | 15 |
| IM | 20 | 20 | 20 | 20 | 20 | 20 | 20 |
| ST | 1.9 | 1.9 | 1.9 | 1.9 | 1.9 | 1.9 | 1.9 |
| PE | 2.1 | 2 | 2 | 2 | 2 | 2 | 2 |
| SC1 | — | — | — | 1.5 | 2.5 | 2 | — |
| SC2 | — | — | — | — | — | — | 0.8 |
| SC3 | — | 2 | — | — | — | — | — |
| SC4 | — | — | 2 | — | — | — | — |
| Properties | | | | | | | |
| Lacquer bonding | 4xGt5 | 4xGt5 | 4xGt5 | 3xGt0 1xGt2 | 4xGt0 | 4xGt0 | 4xGt0 |
| After Schwitzwasser test passed + non-passed - | non-tested | non-tested | non-tested | + | + | + | + |
| Vicat B (°C.) | 126 | | | 123 | 120 | 121 | 124 |

It may be seen from the table that the addition of a dimethyl silicone fluid (SC1 and SC2) leads to an improvement of the lacquer bonding. Only a slight reduction of the Vicat B value results from the addition of the dimethyl silicone fluid in the quantity required for the improvement of the lacquer bonding.

A methyl phenyl silicone fluid or a copolymer of dimethyl silicone and diphenyl silicone (comparative examples B and C) does not provide any improvement of the lacquer bonding.

We claim:

1. A polymer mixture consisting essentially of, (A) a polybutylene terephthalate and (B) an aromatic polycarbonate, characterized in that the polymer mixture consists essentially of 0.1-5 parts by weight of a dialkyl silicone fluid (C) per 100 parts by weight of A+B, whereby bonding is improved between a surface of an article formed from the polymer mixture and a lacquer layer applied thereto.

2. A polymer mixture as claimed in claim 1, characterized in that the dialkyl silicone fluid is dimethyl silicone fluid.

3. A polymer mixture as claimed in claim 1, wherein the weight ratio of polybutylene terephthalate to the aromatic polycarbonate is more than 0.7.

4. A polymer mixture as claimed in claim 1, further consisting essentially of 0.1-100 parts by weight of one or more additives selected from the group consisting of stabilizers, transesterification inhibitors, dyes, pigments, fillers, non-aluminum reinforcing fibers and release agents per 100 parts by weight of A+B.

5. A polymer mixture as claimed in claim 1, characterized in that the polymer mixture further consists essentially of 0.1-50 parts by weight of an agent to improve the impact strength per 100 parts by weight of A+B.

6. A polymer mixture as claimed in claim 5, characterized in that the agent to improve the impact strength is a core-shell polymer having a rubber-like core of an acrylate rubber or a butadiene rubber on which one or more shells of a vinylaromatic compound, a vinylcyanide compound, an alkyl(meth)acrylate, a (meth)acrylic acid or any mixtures thereof, have been grafted.

7. Pellets extruded from the polymer mixture of claim 1.

8. An injection molded article prepared from the pellets of claim 7.

9. The article of claim 8 further consisting essentially of a lacquer layer on a surface of the injection molded article.

10. A polymer mixture as claimed in claim 1, further consisting essentially of polyethylene.

11. A polymer mixture as claimed in claim 2, further consisting essentially of polyethylene.

12. A polymer mixture as claimed in claim 5, further consisting essentially of 2.0 parts by weight polyethylene, per 100 parts by weight of the polymer mixture.

13. The pellets according to claim 7 further consisting essentially of 2.0 parts by weight polyethylene per 100 parts by weight of the polymer mixture.

14. A polymer mixture consisting essentially of (A) a polybutylene terephthalate; (B) an aromatic polycarbonate; (C) 0.1-5 parts by weight of dimethyl silicone fluid per 100 parts by weight of A+B, the weight ratio of polybutylene terephthalate to aromatic polycarbonate being more than 0.7; and (D) 0.1-50 parts by weight of an agent to improve the impact strength per 100 parts by weight of A+B, whereby bonding is improved between a surface of an article formed from the polymer mixture and a lacquer layer applied thereto.

15. The polymer mixture as claimed in claim 14, wherein the agent to improve the impact strength is a core-shell polymer having a rubber-like core of an acrylate rubber or a butadiene rubber on which one or more shells of a vinylaromatic compound, a (meth)acrylic acid or any mixtures thereof, have been grafted and further consisting essentially of 0.1-100 parts by weight of at least one additive selected from the group consisting of polyethylene, stabilizers, transesterification inhibitors, dyes, pigments, fillers, non-aluminum reinforcing fibers and release agents per 100 parts by weight of A+B.

16. Pellets extruded from the polymer mixture of claim 14.

17. Pellets extruded from the polymer mixture of claim 15.

18. An injection molded article prepared from the pellets of claim 16.

19. An injection molded article prepared from the pellets of claim 17.

20. The article of claim 18 further consisting essentially of a lacquer layer on a surface of the injection molded article.

21. The article of claim 19, further consisting essentially of a lacquer layer on a surface of the injection molded article.

* * * * *